US009911347B2

(12) United States Patent
Dore

(10) Patent No.: US 9,911,347 B2
(45) Date of Patent: Mar. 6, 2018

(54) INTERACTIVE AND EDUCATIONAL CONTAINERS

(71) Applicant: Carol Bonner Design LLC, Seattle, WA (US)

(72) Inventor: Carol Dore, Seattle, WA (US)

(73) Assignee: Carol Bonner Design LLC, Seattle, WA (US)

( * ) Notice: Subject to any disclaimer, the term of this patent is extended or adjusted under 35 U.S.C. 154(b) by 201 days.

(21) Appl. No.: 14/820,948

(22) Filed: Aug. 7, 2015

(65) Prior Publication Data
US 2015/0348425 A1 Dec. 3, 2015

(51) Int. Cl.
G09B 25/00 (2006.01)
G09B 1/06 (2006.01)
G09B 17/00 (2006.01)
G09B 23/02 (2006.01)
G09B 19/00 (2006.01)
G09B 1/16 (2006.01)
G09B 19/02 (2006.01)

(52) U.S. Cl.
CPC ............ G09B 1/06 (2013.01); G09B 1/16 (2013.01); G09B 17/00 (2013.01); G09B 19/0023 (2013.01); G09B 19/02 (2013.01); G09B 23/02 (2013.01)

(58) Field of Classification Search
USPC ......... 434/98, 101, 102, 104, 172, 173, 174, 434/198, 199, 205, 402, 404, 405
See application file for complete search history.

(56) References Cited

U.S. PATENT DOCUMENTS

| | | | | |
|---|---|---|---|---|
| 407,374 A | * | 7/1889 | Smith | G09B 17/00 235/87 R |
| 1,378,893 A | * | 5/1921 | Newell | G09B 17/00 434/402 |
| 2,411,717 A | * | 11/1946 | Fay | G09B 1/20 434/174 |
| 2,938,282 A | * | 5/1960 | Spielman | G09B 17/00 206/214 |
| 3,574,957 A | * | 4/1971 | Bello-Bridick | G09B 1/20 40/324 |
| 3,717,942 A | * | 2/1973 | Presby | G09B 17/00 273/155 |
| 4,146,978 A | * | 4/1979 | Breslow | A63F 3/0423 273/143 R |

(Continued)

Primary Examiner — Kurt Fernstrom
(74) Attorney, Agent, or Firm — John W. Branch; Lowe Graham Jones PLLC

(57) ABSTRACT

Interactive and educational containers that include a body and a band slidingly mounted to the body. The body defines a cylinder and an opening and includes a base and a sidewall that extends around the perimeter of the base. The sidewall includes an exterior face and a first set of indicia disposed on the exterior face of the sidewall at a plurality of radial positions around the sidewall. The band has an exterior face and a second set of indicia disposed on the exterior face of the band in a plurality of radial positions around the band. The band rotates around the sidewall to a plurality of radial positions where the first set of indicia and the second set of indicia align. The first and second sets of indicia are selected to have educational significance when aligned in selected combinations.

18 Claims, 8 Drawing Sheets

(56) References Cited

U.S. PATENT DOCUMENTS

| | | | | |
|---|---|---|---|---|
| 4,389,193 A * | 6/1983 | Phillips | ............... | G09B 1/22 |
| | | | | 434/174 |
| 4,608,015 A * | 8/1986 | Smigel | ............... | A61C 19/10 |
| | | | | 433/26 |
| 4,651,992 A * | 3/1987 | Danino | ............... | A63F 9/0098 |
| | | | | 273/155 |
| 5,066,234 A * | 11/1991 | LeDesma | ............... | G09B 3/00 |
| | | | | 434/205 |
| 5,203,706 A * | 4/1993 | Zamir | ............... | G09B 1/16 |
| | | | | 434/159 |
| 5,400,907 A * | 3/1995 | Chen | ............... | A47G 19/2227 |
| | | | | 206/459.1 |
| 5,529,497 A * | 6/1996 | Bigold | ............... | G09B 19/02 |
| | | | | 434/191 |
| 5,788,232 A * | 8/1998 | Binkley | ............... | A63F 9/0811 |
| | | | | 273/153 S |
| D404,969 S * | 2/1999 | Krenzler | ............... | D7/507 |
| 6,142,784 A * | 11/2000 | Wood | ............... | G09B 5/065 |
| | | | | 434/188 |
| 6,869,286 B2 * | 3/2005 | Furry | ............... | G09B 19/04 |
| | | | | 434/156 |
| 7,774,963 B2 * | 8/2010 | Puglisi | ............... | G09F 23/00 |
| | | | | 40/334 |
| 7,806,296 B2 * | 10/2010 | Connors | ............... | B65D 81/363 |
| | | | | 206/457 |
| 2004/0060212 A1 * | 4/2004 | Murphy | ............... | G09F 3/00 |
| | | | | 40/324 |

\* cited by examiner

INTERACTIVE AND EDUCATIONAL CONTAINERS

BACKGROUND

The present disclosure relates generally to educational tools. In particular, interactive and educational containers are described.

Education is a central concern to parents, society, and to national prosperity. Early education is recognized as a highly important concept to build a strong foundation for later educational initiatives in the classroom and other sources. Core educational concepts that are important for children to be introduced to at a young age include basic concepts in mathematics, spelling, and color characteristics. Unfortunately, many children lack access to educational tools that can enable their educational development in these and other areas.

Known educational tools are not entirely satisfactory for the range of applications in which they are employed. For example, existing educational tools fail to provide a fun, interactive experience to children. Parents and educators alike recognize that interactive and fun activities are effective ways to maintain children's focus and interest. Maintaining a child's focus and interest is essential to conveying core educational concepts.

Many existing educational tools do not give children and parents sufficient opportunity to interact with the tool, which causes children to lose interest in the tool and the educational concepts involved. Physically manipulating and exploring items is inherent to children, and tools are needed that facilitate those natural physical instincts of children to hold their attention.

Existing educational tools also suffer from being too complicated in some contexts. For example, computerized educational tools are prone to being too complicated or too abstract to meet children's needs. Computerized tools may allow interaction with a mouse or touch screen, but such interaction is not as inherent to children as is manipulating and exploring physical items with an optimum number of interactive degrees of freedom.

A particular limitation of convention al educational tools is their failure to bridge gaps between abstract concepts and concrete realities more readily understood by children. For example, educational tools directed to mathematics are often limited to symbolic representations of numbers without providing tangible items to give context to the mathematical concepts involved. Educational tools attempting to teach children letters and spelling often lack reinforcing items that help children see hose letters interact to form words. Tools attempting to explain colors and how they interact to form blended colors often rely on discrete color displays that can not be physically combined to demonstrate how colors combine to form blended colors.

Another limitation of conventional educational tools is that they are not configured to contain, store, and transport items that contribute to the educational experience. It is well known that children enjoy interacting with toys, cards, paint, markers, crayons, books, and other items. It is also well known that toys and the like will end up everywhere or get lost without a convenient place to store them. Educational tools that could effectively accommodate items to supplement the educational experience into a self-contained system would provide numerous advantages over conventional educational tools.

Thus, there exists a need for educational tools that improve upon and advance the design of known educational tools. Examples of new and useful educational tools relevant to the needs existing in the field are discussed below.

Disclosure addressing one or more of the identified existing needs is provided in the detailed description below. Examples of references relevant to educational tools include U.S. Pat. Nos. 8,459,999; 2,932,909; D394878; D395675; D651649; 3,419,973; 3,783,531; 3,762,071; 3,200,517; 3,199,227; 4,634,385; 4,389,193; 3,289,324; 1,671,758; 4,643,680; 7,354,070; 4,313,727; 3,248,809; 6,869,286; and 7,938,282. Also relevant is the current inventor's copending U.S. application Ser. No. 14/755,281, filed on. Jun. 30, 2015, which is hereby incorporated by reference for all purposes. The complete disclosures of the above patents and patent applications are herein incorporate by reference for all purposes.

SUMMARY

The present disclosure is directed to interactive and educational containers that include a body and a band slidingly mounted to the body. The body defines a cylinder and an opening and includes a base and a sidewall that extends around the perimeter of the base. The sidewall includes an exterior face and a first set of indicia disposed on the exterior face of the sidewall at a plurality of radial positions around the sidewall. The band has an exterior face and a second set of indicia disposed on the exterior face of the band in a plurality of radial positions around the band. The band rotates around the sidewall to a plurality of radial positions where the first set of indicia and the second set of indicia align. The first and second sets of indicia are selected to have educational significance when aligned in selected combinations.

DETAILED DESCRIPTION

Figure 1:
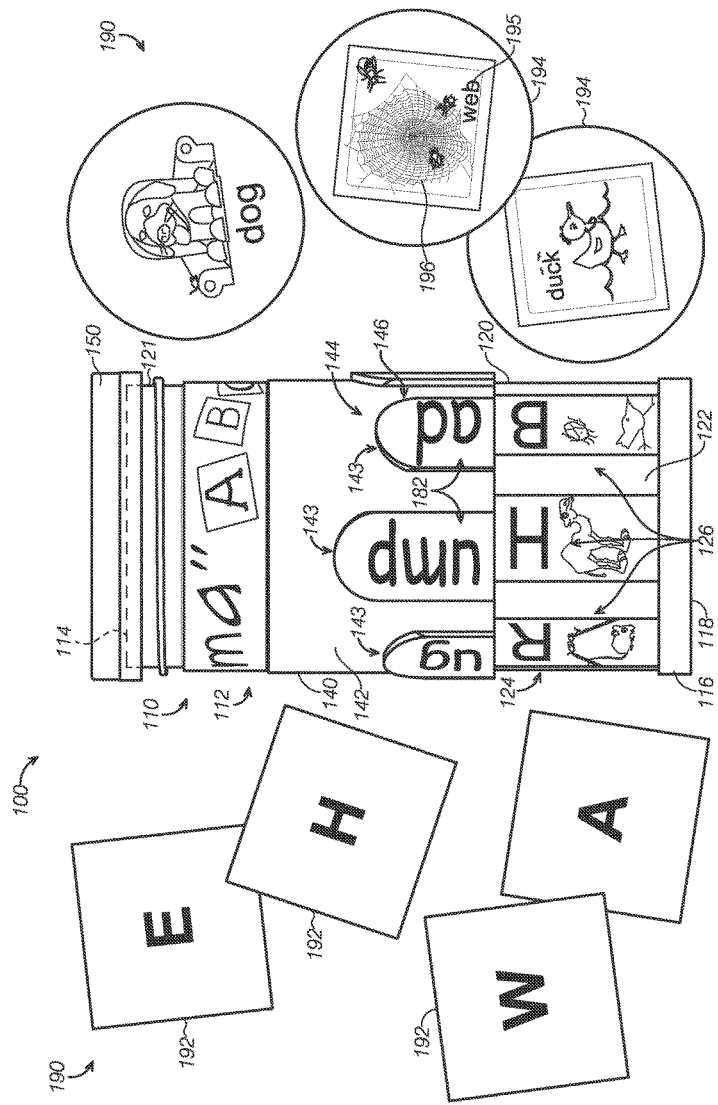
FIG. 1 is an elevation view of a first example of an interactive and educational container, the container being focused on letters and the letters being aligned to form words.

The disclosed educational containers will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various educational containers are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The educational containers described herein function to provide children, parents, and educators with fun, interactive ways to explore core educational concepts and to store items. The shortcomings of conventional educational tools are effectively addressed by the educational containers described herein.

For example, educational container 100 provides users with a variety of physical and social interaction options without providing so many options that the tool becomes offputtingly complex. Unlike computer and computer tablet based tools, educational container 100 provides users with opportunities to interact with physical items rather than peripheral devices or touchscreens, which are steps removed from directly interacting with educational components.

Educational container 100 further provides users with a variety of games, challenges, and activities to play. Educational container 100 provides additional functionality, entertainment, and appeal by serving as a container and containing items (in this case letter and word cards) that appeal to children and that enhance the educational experience. By serving as a container, the items are effectively stored and transported without leading to clutter or to lost items.

Further addressing limitations existing in the prior art, educational container 100 provides a rotating band that children can manipulate and align to form words to help encourage children to explore letters and to learn now to spell basic words. Educational container 100 contains letter and word cards to complement the letter and word educational concepts explored by educational container 100. The physical interaction with selectable letter combinations and physical letter and word cards help reinforce connections between letters, letter combinations, and recognized words.

Also addressing limitations of conventional educational tools, educational container 200 helps children bridge conceptual gaps between abstract representations of numbers as symbols. Educational container provides physical objects, rubber ducks in this case, to represent numbers in addition to rotating bands of numbers that can be positioned to form mathematical operations like addition and subtraction. Pictorial depictions of numerical quantities on educational container 200 help reinforce mathematical games that can be played with educational container 200.

Educational container 300 also addresses shortcomings of existing educational tools along similar lines, but with regard to color related educational concepts. Educational container 300 provides a rotating band for physical interaction with colors and with blending colors. Container 300 further provides finger paint contained within the container it defines to allow children to tangibly interact with different colors.

First Embodiment of the Educational Container.

Figure 2:
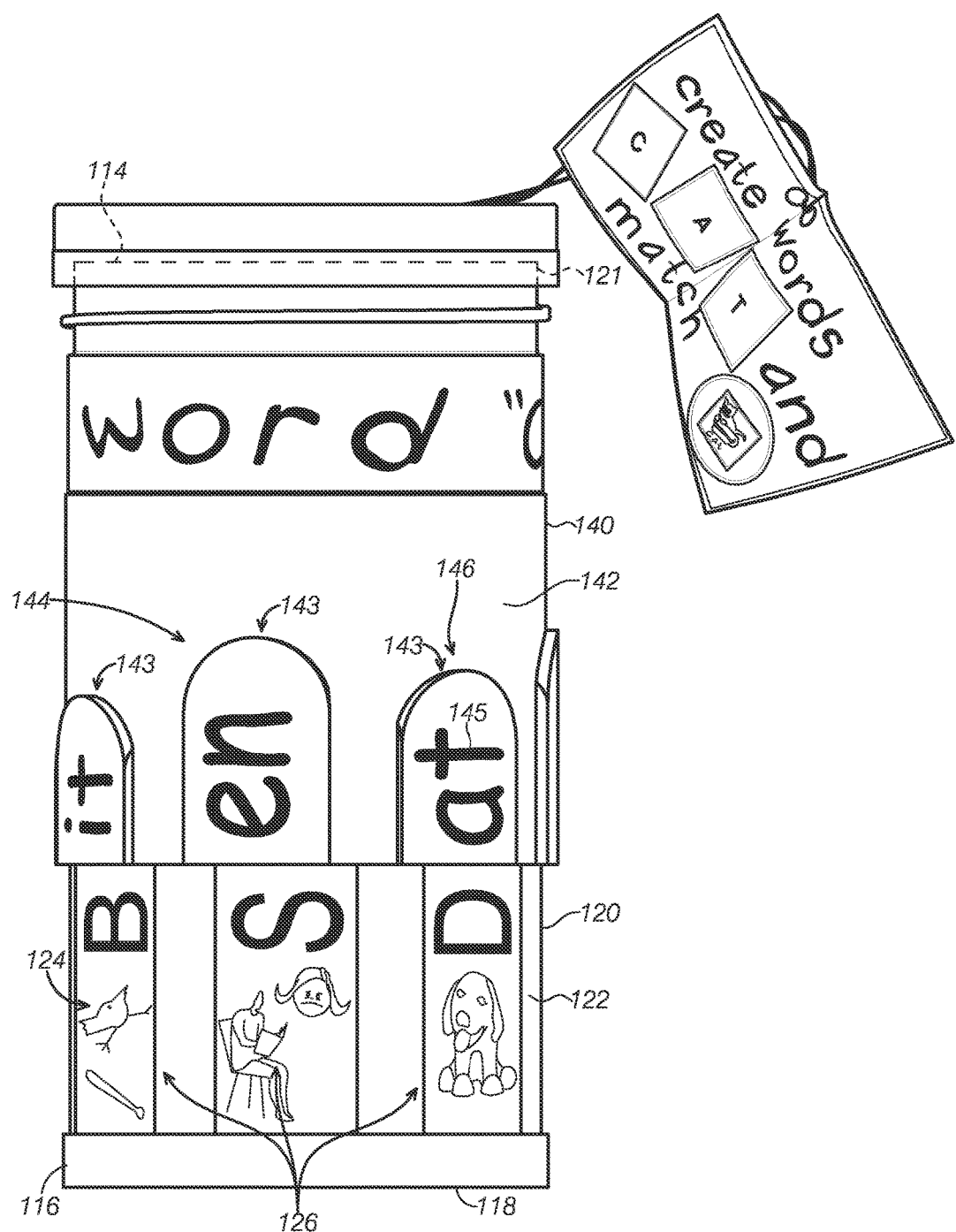
FIG. 2 is an elevation view of the container shown in FIG. 1 depicting the letters misaligned and not forming words.
Figure 3:
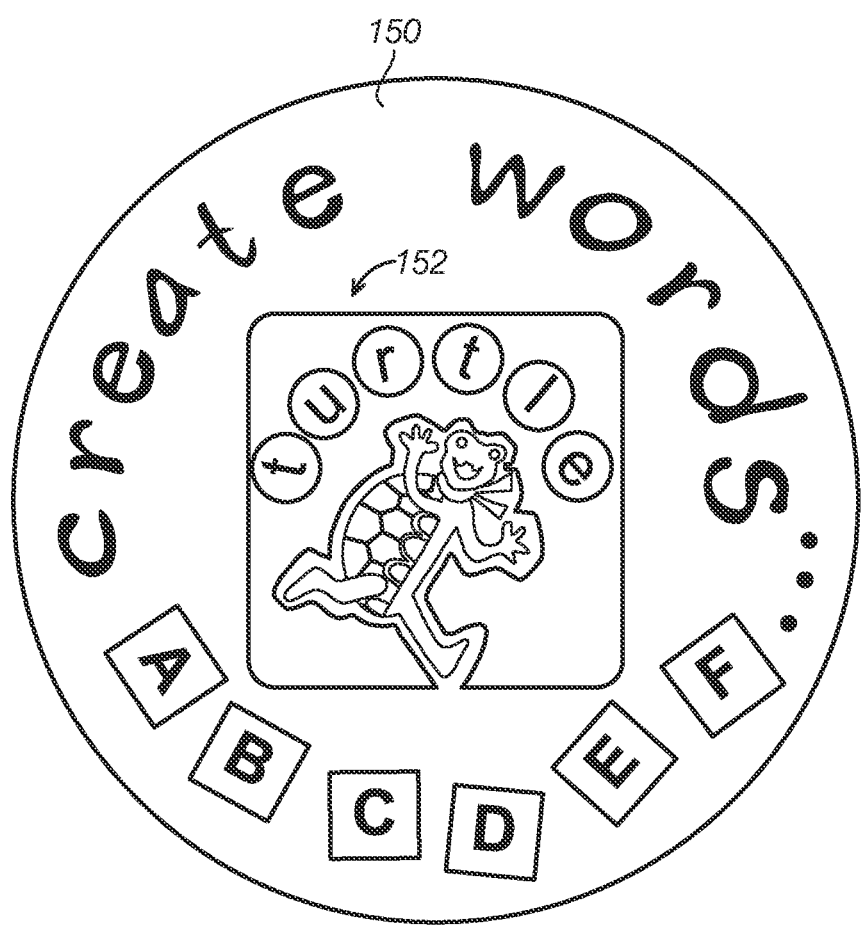
FIG. 3 is a plan view of the educational container shown in FIG. 1 depicting an educational feature provided on a lid of the educational container.

With reference to FIGS. 1-3, educational container 100 and its components will now be described in more detail. Container 100 includes a body 110, a band 140, a set of items 190, and a lid 150. The reader can see in FIG. 2 that container 100 includes an optional hanging card with basic instructions for how to use container 100.

Container 100 functions to provide users with interactive ways to explore core educational concepts related to letters and words and with a means to store complementary educational items. Educational tool 100 meets the current English language standards for children ages 3 to 6 as established by the Common Core State Standards. The details of the components of container 100 will now be described below.

Body.

Body 110 supports the other components of educational container 100 and defines container for storing items. As can be seen in FIGS. 1 and 2, body 110 defines a cylinder 112 with an opening at a top end 114 of body 110.

In other examples, the body defines shapes other than cylinders, such as boxes, spheres, pyramids, extended regular polygons, and extended irregular shapes. In this context, extended means a cross sectional shape, such as a regular or irregular polygon, extending in a length or height dimension to create a three-dimensional container. Shapes that enable a band to effectively move relative to the body are preferred.

Body 110 includes a base 116 and a sidewall 120. Base 116 is disposed at a base end 118 opposite top end 114. Sidewall 120 extends around the perimeter of base 116 and extends from base end 118 to top end 114.

As shown in FIGS. 1 and 2, sidewall 120 includes an exterior face 122 and a first set of indicia 124 disposed on exterior face 122. First set of indicia 124 includes indicia 125 and illustrations below indicia 125 at a plurality of radial positions 126 around sidewall 120. In the present example, indicia 125 in first set of indicia 126 are letters.

The illustrations below indicia 125 support the educational significance of the letter and word concepts introduced by container 100. In particular, the illustrations are selected to correspond with words that can be formed by aligning the letters in first set of indicia 126 with the letter combinations in second set of indicia 146. As shown ii FIG. 2, the illustrations may include a baseball bat, a bird, a person sitting, a sad face, or a dog corresponding to the words BAT, BIRD, SIT, SAD, and DOG that may be formed with container 100. Containers described herein may use any suitable illustration or illustrations to correspond with potential word formations and word pairings.

Sidewall 120 defines an open interior space 121 within body 110. Set of items 190 are removably disposed within interior space 121. Of course, other items in addition or alternatively to items 190 may be stored in interior space as the user desires.

Band.

Band 140 is slidingly mounted on sidewall 120 and may be selectively rotated around sidewall 120 by the user. In the present example, band 140 frictionally engages sidewall 120 and is configured to rotate around sidewall 120 to a plurality of substantially continuous radial positions. However, in some examples, the band is configured to rotate around the sidewall to discrete positions. The band may mount to the sidewall by any currently known or later developed means.

As shown in FIGS. 1 and 2, band 140 has an exterior face 142 and a second set of indicia 144 disposed on exterior face 142. Second set of indicia 144 includes indicia 145 in a plurality of radial positions 143 around band 140. In the example shown in FIGS. 1 and 2, indicia 143 include letters forming incomplete portions of words.

Band 140 is configured to rotate around sidewall 120 to a plurality of radial positions 146 where first set of indicia 124 and second set of indicia 144 align. As can be seen in FIGS. 1 and 2, first set of indicia 124 and second set of indicia 144 are selected to have educational significance when aligned in selected combinations. In particular, as shown in FIG. 1, first set of indicia 124 and second set of indicia 144 form words 182 when aligned in the selected combinations. As shown in FIG. 2, first set of indicia 124 and second set of indicia 144 do not form words when aligned in combinations other than the selected combinations.

In the particular example, first set of indicia 124 includes single letters positioned to align with two letter combinations in second set of indicia 144 on band 140. However, in other examples, the first set of indicia includes multiple letters or combinations of single letters and multiple letters at different radial positions to align with the letters, either single letters or multiple letters, included in the second set of indicia. The complexity of letter combinations can be selected based on the age or educational level of the intended user.

Items.

Set of items 190 removably disposed within interior space 121 is selected to reinforce the educational significance of educational container 100. In particular, set of items 190 is selected to reinforce the educational significance of first set of indicia 124 and second set of indicia 144 when they are aligned in the selected combinations to form properly spelled words.

In the example shown in FIGS. 1-3, set of items 190 includes a plurality of letter cards 192 and a plurality of word cards 193. Letter cards 192 include letters corresponding to the letters included in first set of indicia 124. Of course, additional or alternative letters may be included in the plurality of letter cards. The letter cards provide a tangible item for a child to select, hold, manipulate, rearrange, and combine with other letter cards to reinforce the letter and word educational concepts introduced by educational container 100.

As can be seen in FIG. 1, word cards 193 include words corresponding to the words formed by first set of indicia 124 and second set of indicia 144 when they are aligned in selected combinations. In some examples, the word cards include additional or alternative words to those formed by the selected combinations of indicia. Word cards 193 include pictorial representations of the words included on the cards. The pictorial representations of the words help children associate the words with real world items and this association is enhanced when children are encouraged to match the pictorial representations with words while using container 100. Children can also draw their own illustrations for words they would like to create on the blank cards provided for added entertainment and educational value.

Lid.

Lid 150 is configured to cover the opening at top end 114 of base 116 of body 110. As can be seen in FIG. 3, lid 150 includes a feature 152 selected to reinforce the educational significance of educational container 100. In particular, feature 152 on lid 150 includes a pictorial depiction of letters arranged in alphabetical order, a word, and a pictorial representation of the word. In the present example, the word included on lid 150 is turtle and a cartoon version of a turtle is depicted to give context to the word.

Second Embodiment of the Educational Container.

Figure 4:
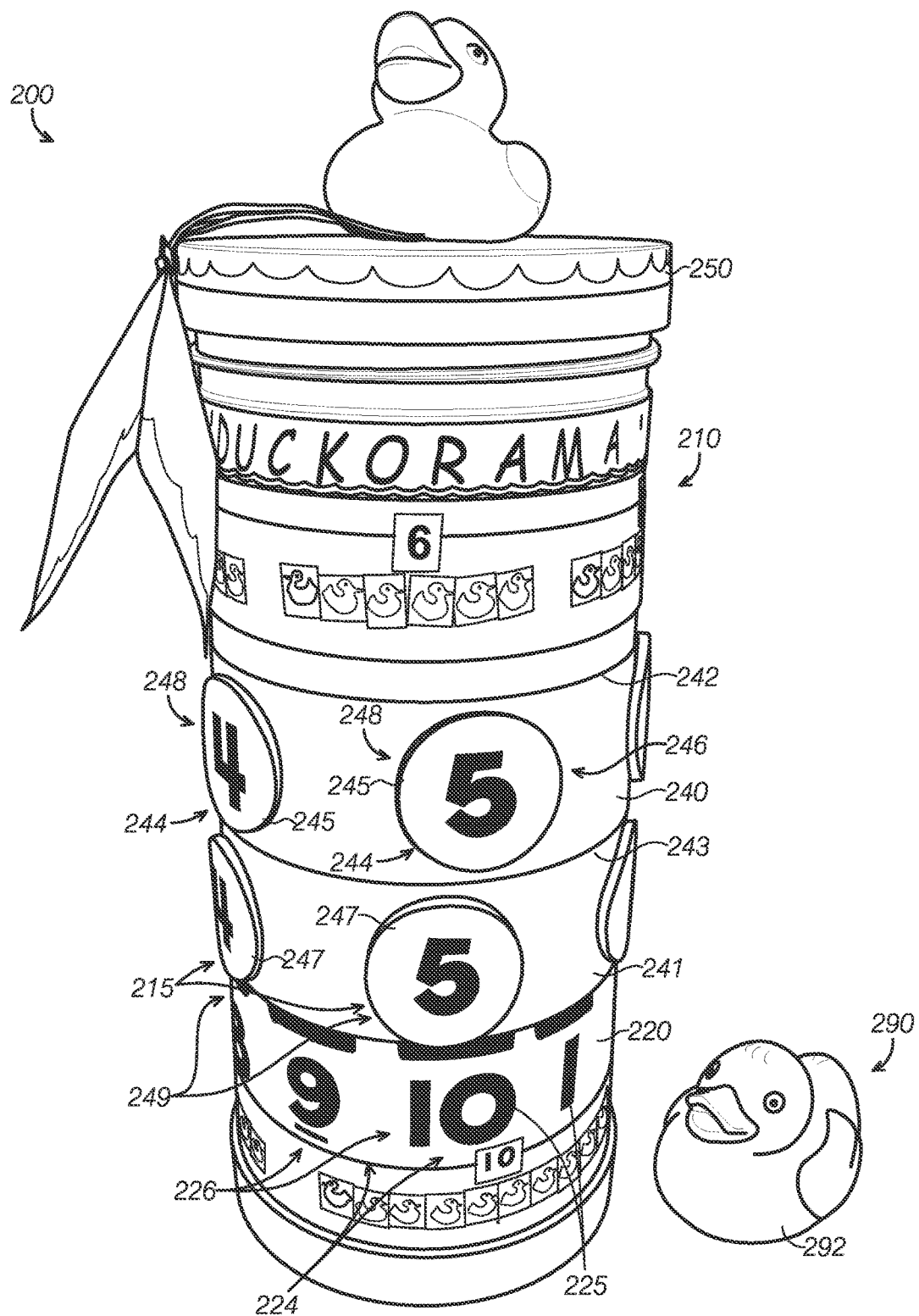
FIG. 4 is a perspective view of a second example of an interactive and educational container, the container being focused on numbers and the numbers being aligned to form mathematically accurate equations.
Figure 5:
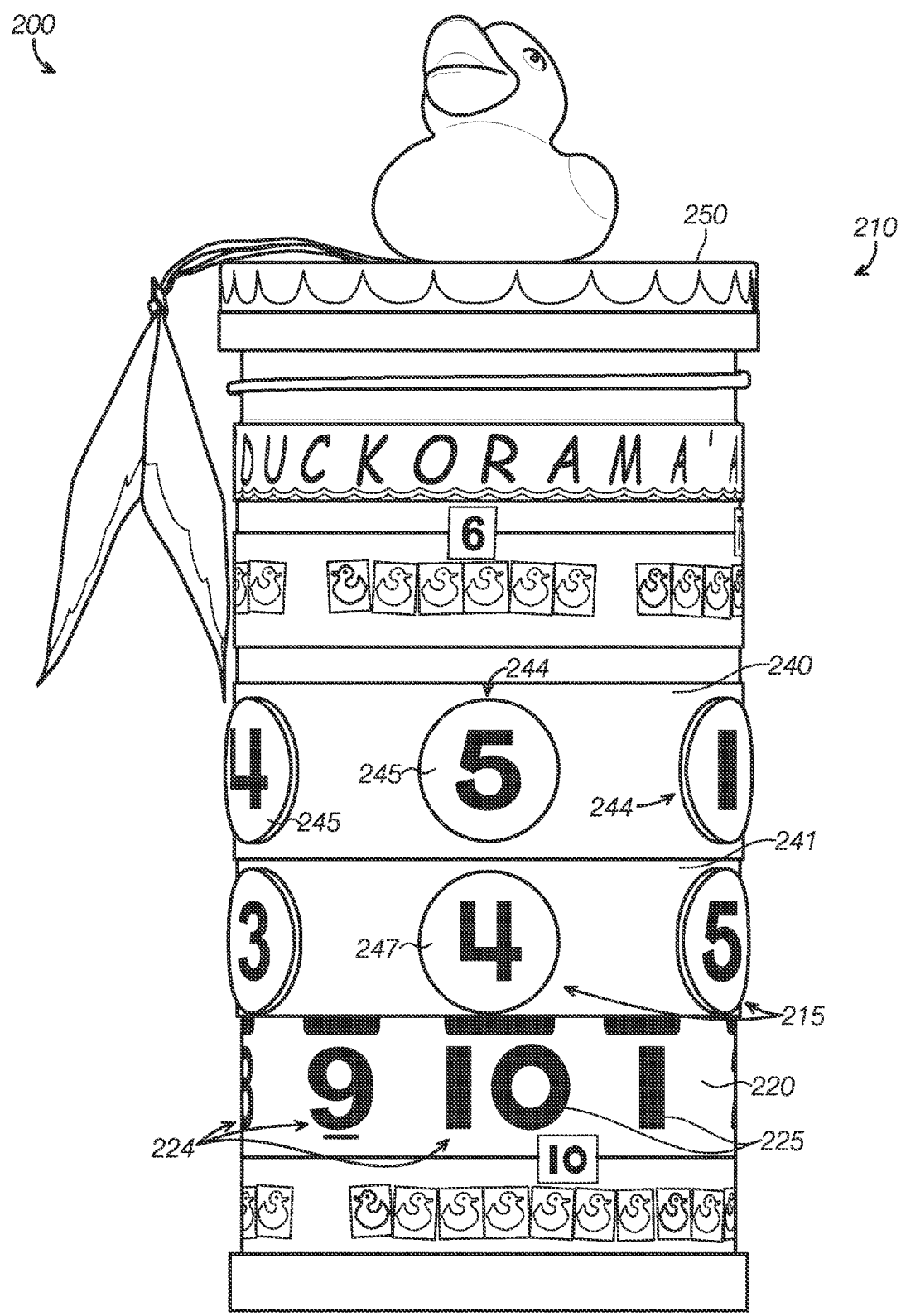
FIG. 5 is an elevation view of the container shown in FIG. 4 depicting the numbers misaligned and not forming mathematically accurate equations.

Turning attention to FIGS. 4 and 5, a second example of an educational container, educational container 200, will now be described. Educational container 200 includes many similar or identical features to educational container 100. Thus, for the sake of brevity, each feature of educational container 200 will not be redundantly explained. Rather, key distinctions between educational container 200 and educational container 100 will be described in detail and the reader should reference the discussion above for features substantially similar between the two educational containers.

Educational container 200 introduces children to core educational concepts related to numbers and mathematical operations, including addition and subtraction. Educational tool 200 meets the current mathematics standards for children ages 3 to 7 as established by the Common Core State Standards. As with educational container 100, educational container 200 provides opportunities for children, parents, and educators to interact with the container and with physical items stored within the container. As can be seen in FIGS. 4 and 5, educational container 200 includes a body 210, a first band 240, a second band 241, a set of items 290, a lid 250, and an instruction card hanging from lid 250.

Body 210 defines a container and includes a sidewall 220. Sidewall 220 includes an exterior face 222 on which a first set of indicia 224 is disposed. First set of indicia 224 includes numbers 225 in a plurality of radial positions 226.

One notable difference between container 100 and container 200 is that educational container 200 includes two bands, first band 240 and second band 241 slidingly mounted on a sidewall 220 as opposed to a single band. First band 240 includes an exterior face 242 on which a second set of indicia 244 is disposed. Second set indicia 244 includes numbers 245 in a plurality of radial positions 248. Second band 241 includes an exterior face 243 on which a third set of indica 215 is disposed. Third set of indicia 215 includes numbers 247 in a plurality of radial positions 249.

First band 240 and second band 241 are configured to rotate around sidewall 220 to a plurality of radial positions where first set of indicia 224, second set of indicia 244, and third set of indicia 215 align. As can be seen in FIG. 4, first set of indicia 224, second set of indicia 244, and third set of indicia 215 collectively form mathematically accurate equations 246 when aligned in the selected combinations. Both addition and subtraction operations may be represented by aligning the sets of indicia of container 200.

In the example shown in FIG. 4, the mathematically accurate equation depicted is 5+5=10 in a vertical orientation. A subtraction operation that could be represented in the vertical alignment of numbers could be 6 in the third (top) set of indicia, 4 in the second (middle) set of indicia, and 2 in the first (bottom) set of indicia to represent the vertically oriented, mathematically accurate equation 6−4=2.

As shown in FIG. 5, first set of indicia 224, second set of indicia 244, and third set of indicia 215 collectively form mathematically inaccurate equations when aligned in combinations other than the selected combinations. In FIG. 5, the reader can see that 5+4=10 is inaccurate. The ability to form accurate and inaccurate equations couple with corresponding explanations and corrections from an educator helps children to understand the difference and the underlying mathematical concepts.

Set of items 290 includes a plurality of toys 292, which in the present example are rubber ducks. Rubber ducks 292 serve as physical items representing the numbers and mathematical concepts introduced with educational container 200. The reader can see pictorial representations of numbers and an equivalent number of duck depictions above and below the sets of indicia. Providing both pictorial representations of ducks and physical ducks with which children may interact helps children give more meaning to the pictorial representations. Displaying numbers associated with the number of ducks pictured and/or the number of physical ducks given to the child helps the symbolic number have more meaning.

Beyond the numerical significance of the ducks (or other type of item), the items may be different colors and help children to concurrently become familiar with naming and identifying colors. In the present example, the rubber ducks are different colors to help with color related educational concepts. The rubber ducks are configured to float for added play and entertainment value, such as counting activities in a bathtub or swimming pool.

Of course, rubber ducks are only one example of a physical item that may be contained in the educational container to help children learn numbers and mathematical concepts. Army men, balls, vehicles, coins, candy, blocks, and the like are all suitable. Any item suitable for physical manipulation by children and sized appropriately for the volume of the container may serve as items within the set of items. Preferably, the container will include pictorial depictions of different quantities of the same item that is contained in the container as a teaching aid. In the present example, the number of toys 292 in set of items 290 is sufficient to enable a user to use toys 292 to represent the numbers of first set of indicia 224 and second set of indicia 244.

Third Embodiment of the Educational Container.

Figure 6:
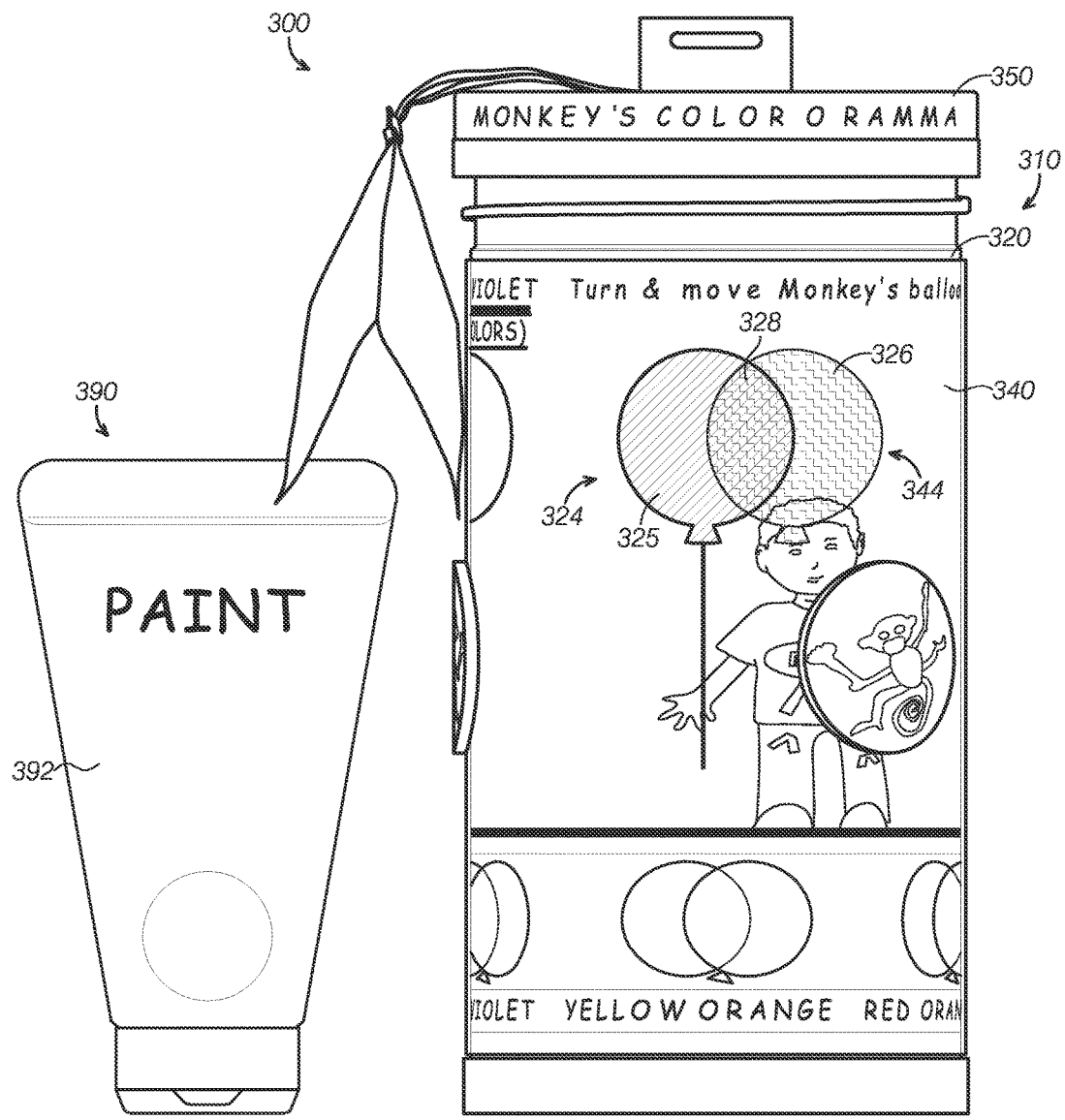
FIG. 6 is an elevation view of a third example of an interactive and educational container, the container being focused on colors and the colors being partially aligned to form a blended color.
Figure 7:
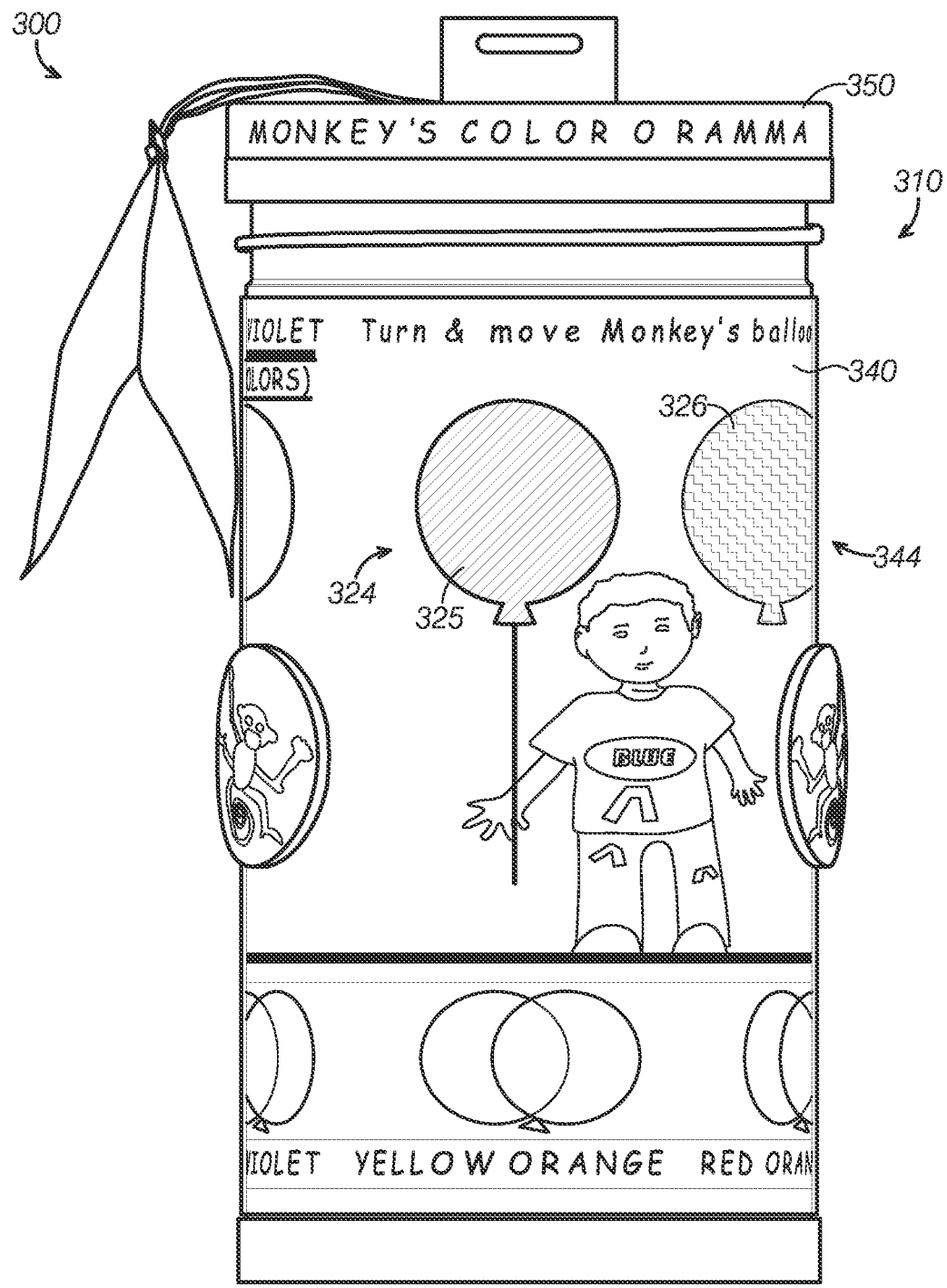
FIG. 7 is an elevation view of the container shown in FIG. 6 depicting the colors misaligned and not blending together.
Figure 8:
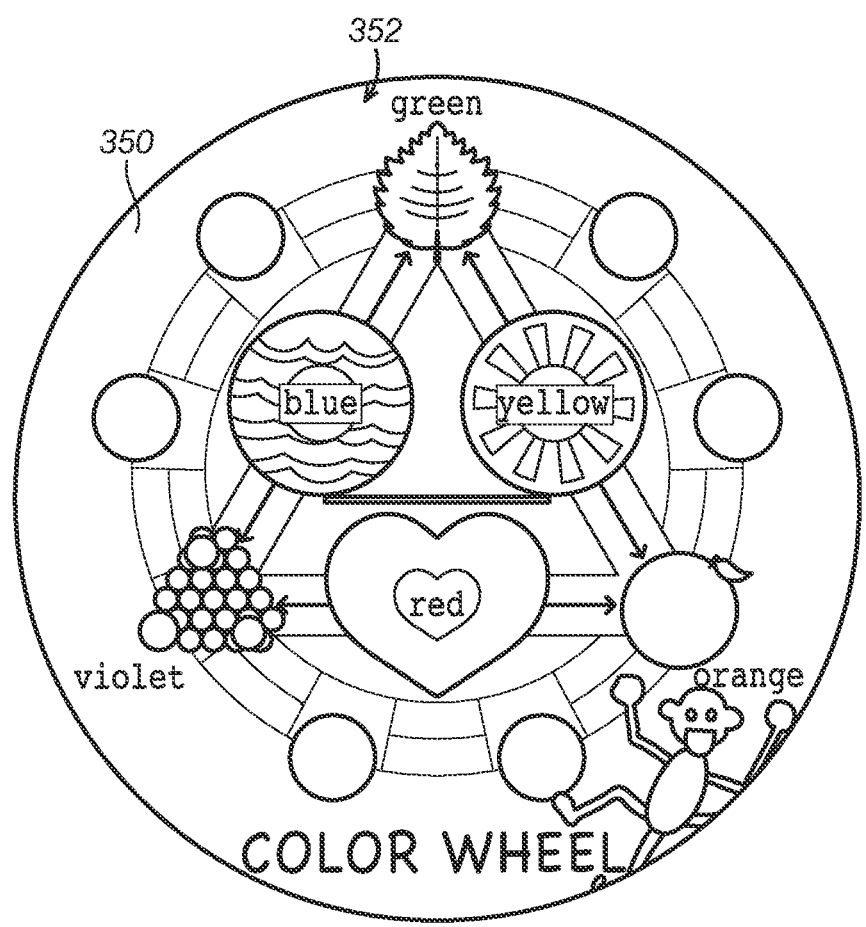
FIG. 8 is a plan view of the educational container shown in FIG. 6 depicting an educational feature provided on a lid of the educational container.

Turning attention to FIGS. 6-8, a third example of an educational container, educational container 300, will now be described. Educational container 300 includes many similar or identical features to the educational containers described above. For the sake of brevity, each feature of educational container 300 will not be redundantly explained, but rather its key distinctions will be described iii detail and the reader should reference the discussion above for features substantially similar between the different embodiments.

Educational container 300 serves to introduce children to educational concepts related to colors and to mixing colors. As shown in FIGS. 6-8, educational container 300 includes a body 310, a band 340, a set of hems 390, a lid 350, and an instruction card hanging from lid 350. The reader can also see that educational container 300 also includes a hang tab coupled to lid 350 to enable container 300 to hang from a rack, such as in a retail environment, or from a hook in a classroom or home environment.

Body 310 includes a sidewall 320 on which a first set of indicia 324 is displayed. First set of indicia 324 includes a color 325 as part of a pictorial depiction. In the example shown in FIGS. 6-8, the pictorial depiction is a child holding a balloon where the balloon includes color 325. Any pictorial depiction where the color is relevant and may be incorporated is suitable. In some examples, the color is provided without an accompanying pictorial depiction.

As the reader can see in FIGS. 6 and 7, band 340 overlies sidewall 320 and is configured to rotate around sidewall 320 to a continuous range of positions. Band 340 is formed of a transparent material to make the pictorial depiction and color 325 displayed on sidewall 320 visible through band 340. Band 340 includes a second set of indicia 344. Second set of indicia 344 includes color 326. In the present example, color 326 is translucent to enable the viewer to see through color 326 to sidewall 320 and to the pictorial depiction and color 325 displayed on sidewall 320. Aligning color 326 with color 325 has educational significance related to color blending concepts.

As shown in FIG. 6, first set of indicia 324 and second set of indicia 344 cooperate to display a blended color 328 that is different than color 325 and translucent color 326. Blended color 328 is formed when translucent color 326 overlaps color 325. Color 326 and color 325 overlap when first set of indicia 324 is aligned with second set of indicia 344 in the selected combinations.

As shown in FIG. 6, set of items 390 includes paint 392 and paper (not pictured). Contained with educational container is a plurality of additional paint containers in a plurality of colors corresponding to the colors displayed in the sets of indicia included in educational container 300. The plurality of colors are selected to enable a user to blend the colors of paint 392 on the included paper consistent with the colors of first set of indicia 324 and second set of indicia 344. Of course, media beyond paper could be included in addition or alternatively to paper, such as canvas.

In the present example, paint 392 is finger paint, but any type of paint may be used, including watercolors, oil based paints, and the like. Markers, pens, crayons and the like are also well suited for the set of items when color is the educational concept addressed by the educational container.

With reference to FIG. 8, the reader can see that lid 350 includes a feature 352 selected to supplement and complement the color related educational concepts introduced by the other components of educational container 300. Feature 352 includes a color triangle with pictorial representations of real world objects corresponding to the colors depicted. In the example shown in FIG. 8, green is represented by a leaf, yellow is represented by a sun, orange is represented by an orange (as in the fruit), red is represented by a heart, violet is represented by grapes, and blue is represented by water.

The reader can see that the color triangle arranged to place the colors in logical positions relative to each other and that arrow cues are provided to demonstrate relationships between the colors. For example, red and yellow both have arrows pointing to orange to depict that red combined with yellow yields the color orange. Thus, feature 352 helps reinforce the color blending concepts introduced by the other components of educational container 300, including band 340, sidewall 320, and finger paint items 392.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An interactive and educational container, comprising:
    a body defining a cylinder and an opening at a top end of the body, the body including:
        a base at a base end opposite the top end; and
        a sidewall that extends around the perimeter of the base and that extends from the base end to the top end, the sidewall including an exterior face and a first set of indicia disposed on the exterior face of the sidewall at a plurality of radial positions around the sidewall, wherein the sidewall defines open interior space within the body; and
    a band slidingly mounted on the sidewall, the band having an exterior face and a second set of indicia disposed on the exterior face of the band in a plurality of radial positions around the band, the band being configured to rotate around the sidewall to a plurality of radial positions where the first set of indicia and the second set of indicia align, wherein the first set of indicia and the second set of indicia are selected to have educational significance when aligned in selected combinations; and
    a set of items removably disposed within the interior space, the set of items being selected to reinforce the educational significance of the first set of indicia and the second set of indicia when aligned in the selected combinations, wherein the set of items includes paint in a plurality of colors when the first set of indicia and the second set of indicia include colors, the plurality of colors being selected to enable a user to blend the colors of paint consistent with the colors of the first set of indicia and the second set of indicia.

2. The container of claim 1, wherein the band frictionally engages the sidewall and is configured to rotate around the sidewall to a plurality of substantially continuous radial positions.

3. The container of claim 1, further comprising a lid configured to cover the opening at the top end and including a feature selected to reinforce the educational significance of the first set of indicia and the second set of indicia when aligned in the selected combinations.

4. The container of claim 1, wherein the first set of indicia includes letters.

5. The container of claim 4, wherein the second set of indicia includes letters.

6. The container of claim 5, wherein the first set of indicia and the second set of indicia form words when aligned in the selected combinations.

7. The container of claim 6, wherein the first set of indicia and the second set of indicia do not form words when aligned in combinations other than the selected combinations.

8. The container of claim 1, wherein the band defines a first band and the container further comprises a second band slidingly mounted on the sidewall, the second band having an exterior face and a third set of indicia disposed on the exterior face of the second band in a plurality of radial positions around the second band, the second band being configured to rotate around sidewall to a plurality of radial positions where the first set of indicia, the second set of indicia, and the third set of indicia align.

9. The container of claim 8, wherein the first set of indicia, the second set of indicia, and the third set of indicia each include numbers.

10. The container of claim 9, wherein the first set of indicia, the second set of indicia, and the third set of indicia collectively form mathematically accurate equations when aligned in the selected combinations.

11. The container of claim 10, wherein the first set of indicia, the second set of indicia, and the third set of indicia collectively form mathematically inaccurate equations when aligned in combinations other than the selected combinations.

12. The container of claim 10, wherein the mathematical equations collectively formed by the first set of indicia, the second set of indicia, and the third set of indicia include adding or subtracting the numbers from the first band with the numbers from the second band to yield the numbers disposed on the exterior face of the sidewall.

13. The container of claim 1, wherein the first set of indicia includes a first color.

14. The container of claim 13, wherein the band is substantially transparent and the second set of indicia includes a translucent color.

15. The container of claim 14, wherein the first set of indicia and the second set of indicia cooperate to display a blended color that is different than the first color and the translucent color when the translucent color overlaps the first color when the first set of indicia is aligned with the second set of indicia in the selected combinations.

16. The container of claim 1, wherein the set of items includes a plurality of toys when the first set of indicia and the second set of indicia include numbers, the number of toys in the plurality of toys being sufficient to enable a user to use the toys to represent the numbers of the first set of indicia and the second set of indicia.

17. The container of claim 1, wherein the set of items includes a plurality of letter cards when the first set of indicia and the second set of indicia include letters, the letter cards corresponding to the letters of the first set of indicia and the second set of indicia.

18. The container of claim 17, wherein the set of items includes a plurality of word cards with a word and a picture corresponding to the word on the word card, the word on the word card corresponding to a word formed by the combination of the first set of indicia and the second set of indicia when aligned in the selected combinations.

* * * * *